(No Model.)

H. ARNOLD.
Potato Digger.

No. 239,692.    Patented April 5, 1881.

WITNESSES:
A. Schehl.
C. Sedgwick

INVENTOR:
H. Arnold
BY
ATTORNEYS.

UNITED STATES PATENT OFFICE.

HENRY ARNOLD, OF PERU, NEW YORK.

POTATO-DIGGER.

SPECIFICATION forming part of Letters Patent No. 239,692, dated April 5, 1881.

Application filed April 17, 1880. (No model.)

*To all whom it may concern:*

Be it known that I, HENRY ARNOLD, of Peru, in the county of Clinton and State of New York, have invented a new and useful Improvement in Potato-Diggers, of which the following is a specification.

In potato-diggers as heretofore constructed scoops and vibrating screens have been used, but such machines have generally been only partially successful in separating the potatoes from the dirt, in consequence of the great accumulation upon the apron, which not only hinders the separation, but adds to the weight and draft of the machine.

The object of my improvements is to prevent any accumulation of soil upon the screen or apron, which I accomplish by commencing the separation at the moment the potatoes and dirt are taken up, and, further, to render the separation more rapid and effective.

Figure 1:
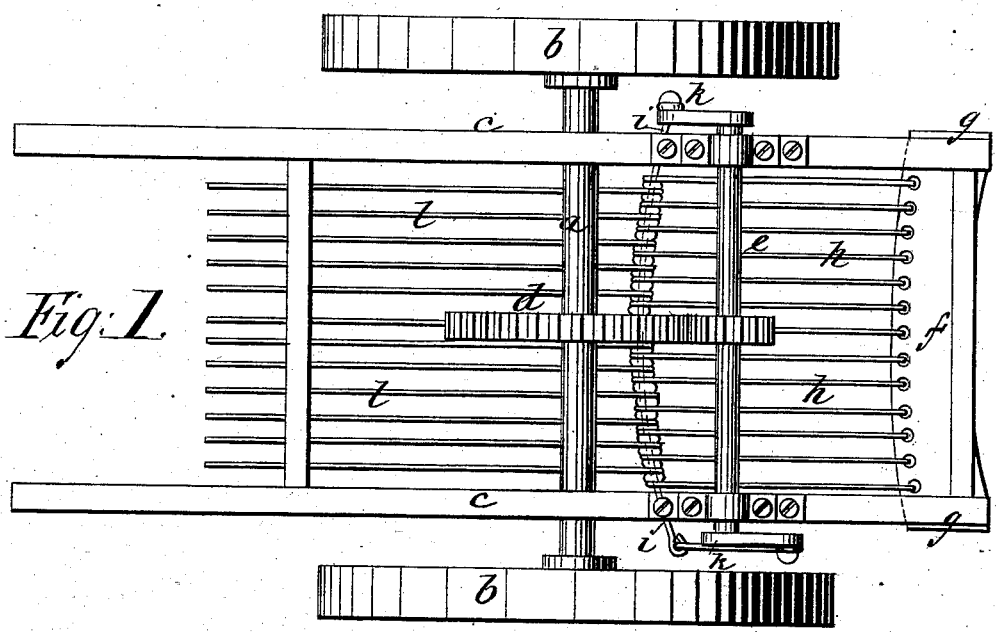
Figure 2:
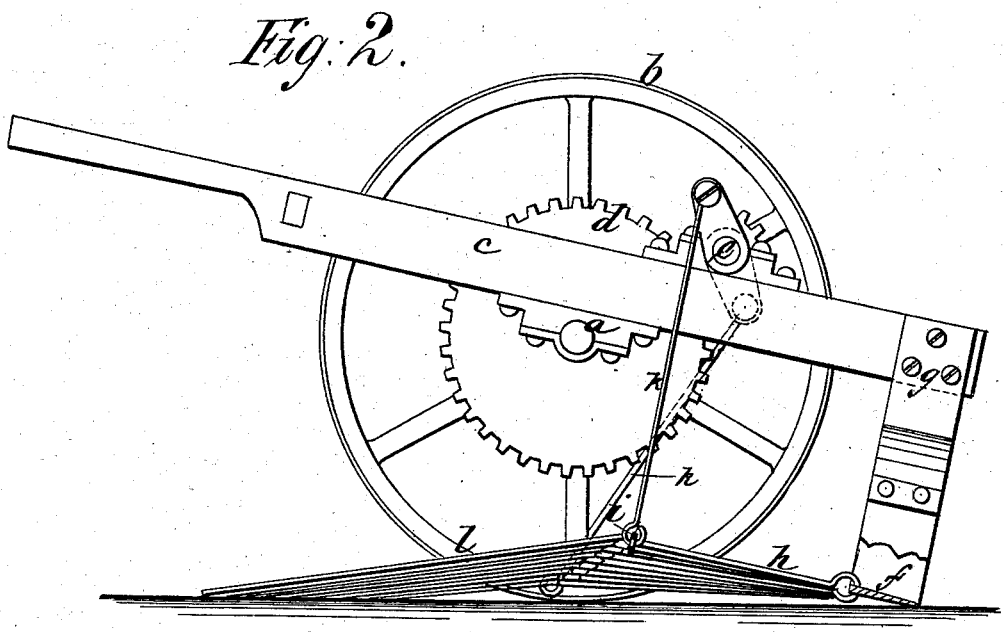

In the accompanying drawings, Figure 1 is a plan view of my potato-digger; and Fig. 2 is a side view, partly in section.

Similar letters of reference indicate corresponding parts.

The axle $a$, upon which are the two supporting-wheels $b$, supports side bars, $c$ $c$, that are formed at their rear ends with handles, by which the machine is to be guided.

Upon the axle $a$ is fitted a large gear-wheel, $d$, which engages with a pinion on shaft $e$, which is fitted across the bars $c$ in suitable boxes. The shaft $e$ is formed at its ends with cranks, the crank at one end being diametrically opposed to the other. This construction furnishes convenient means for obtaining the required motion and speed for the vibrating screen.

At the forward end of the side bars, $c$, the nose-piece or blade $f$ is attached by rigid straps or hangers $g$. This piece $f$ is beveled to form a cutting-edge at the front.

To the back of the piece $f$ the bars $h$ of the vibrating apron or screen are attached. These bars $h$ are formed with eyes at their ends, which are strung in perforations in piece $f$, so that each bar may move freely and independently. The rear ends of bars $h$ are also formed with eyes, through which pass a cross-bar, $i$, that is suspended by rods $k$ $k$ from the cranks of the shaft $e$.

To the bar $i$ the trailing bars $l$ are also hung, and on the bar $i$, between the bars $h$ $l$, rings or washers are placed to retain the said bars at the proper distance apart.

In operation the nose-piece or blade $f$ will incline with its forward edge downward, the ends of the bar $i$ will be vibrated up and down by the crank-shaft, one end rising while the other falls. The soil gathered by the blade passes immediately onto the screen, and the movement given thereto by the cranks will be most effective in causing the dirt to fall through while the potatoes are retained. The trailing bars $l$ act to hold the potatoes after they pass over the forward bars and separate them from any remaining dirt.

Having thus described my invention, I claim as new and desire to secure by Letters Patent—

In a potato-digger, the combination of the forwardly-inclined blade $f$, rigidly attached to hangers $g$, and the screen having rods $h$, connected by eyes and perforations with the blade in front, and at the rear with a rising and falling rod, $i$, as and for the purpose described.

HENRY ARNOLD.

Witnesses:
GEORGE D. MOON,
WILLIAM E. BEACH.